United States Patent
Agarwal et al.

(10) Patent No.: US 11,023,686 B2
(45) Date of Patent: Jun. 1, 2021

(54) METHOD AND SYSTEM FOR RESOLVING ABSTRACT ANAPHORA USING HIERARCHICALLY-STACKED RECURRENT NEURAL NETWORK (RNN)

(71) Applicant: Tata Consultancy Services Limited, Mumbai (IN)

(72) Inventors: Puneet Agarwal, Noida (IN); Prerna Khurana, Noida (IN); Gautam Shroff, Gurgaon (IN); Lovekesh Vig, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 218 days.

(21) Appl. No.: 16/506,521

(22) Filed: Jul. 9, 2019

(65) Prior Publication Data

US 2020/0019610 A1    Jan. 16, 2020

(30) Foreign Application Priority Data

Jul. 10, 2018    (IN) .............................. 201821025758

(51) Int. Cl.
| | |
|---|---|
| *G06F 17/00* | (2019.01) |
| *G06F 40/30* | (2020.01) |
| *G06F 40/295* | (2020.01) |
| *G06N 3/08* | (2006.01) |
| *H04L 12/58* | (2006.01) |

(52) U.S. Cl.
CPC ............ *G06F 40/30* (2020.01); *G06F 40/295* (2020.01); *G06N 3/08* (2013.01); *H04L 51/02* (2013.01)

(58) Field of Classification Search
None
See application file for complete search history.

(56) References Cited

U.S. PATENT DOCUMENTS 6,975,986 B2 *  12/2005  Hartley ................... G10L 15/22
                                                              704/254
2008/0205653 A1 *  8/2008  Haddad ................. H04L 63/123
                                                              380/278

FOREIGN PATENT DOCUMENTS

| EP | 3594862 A1 * | 1/2020 | ............. G06N 3/084 |
| IN | 201721032101 | 3/2019 | |

* cited by examiner

*Primary Examiner* — Satwant K Singh
(74) *Attorney, Agent, or Firm* — Finnegan, Henderson, Farabow, Garrett & Dunner LLP (57) ABSTRACT

Conversational systems are required to be capable of handling more sophisticated interactions than providing factual answers only. Such interactions are handled by resolving abstract anaphoric references in conversational systems which includes antecedent fact references and posterior fact references. The present disclosure resolves abstract anaphoric references in conversational systems using hierarchically stacked neural networks. In the present disclosure, a deep hierarchical maxpool network based model is used to obtain a representation of each utterance received from users and a representation of one or more generated sequences of utterances. The obtained representations are further used to identify contextual dependencies with in the one or more generated sequences which helps in resolving abstract anaphoric references in conversational systems. Further, a response for an incoming sequence of utterances is retrieved based on classification of incoming sequence of utterances into one or more pre-created responses. The proposed model takes lesser time to retrain.

15 Claims, 6 Drawing Sheets

METHOD AND SYSTEM FOR RESOLVING ABSTRACT ANAPHORA USING HIERARCHICALLY-STACKED RECURRENT NEURAL NETWORK (RNN)

PRIORITY CLAIM

This U.S. patent application claims priority under 35 U.S.C. § 119 to India Application No. 201821025758, filed on Jul. 10, 2018. The entire contents of the aforementioned application are incorporated herein by reference.

TECHNICAL FIELD

The disclosure herein generally relates to field of anaphoric reference resolution, and, more particularly, to resolving abstract anaphoric references in conversational systems using hierarchically stacked neural networks.

BACKGROUND

Human-Computer Interaction (HCI) is one of the main areas of research. With HCI incorporated in large number of systems for wide variety of applications, an increased demand for more natural dialogue systems, capable of more sophisticated interactions than merely providing factual answers is necessary. While processing natural language, resolution of anaphoric references is a fundamental step. Users interacting with HCI based systems not only expect the system to perform co-reference resolution of anaphora, but also of the antecedent or posterior facts presented by users with respect to user's query. Presence of such facts in a conversation sometimes modifies the answer of main query. For example, answer to 'how many sick leaves do I get?' would be different when a fact 'I am on contract' is also present. Sometimes there is a need to collectively resolve multiple facts. Typical example of HCI based system may be a conversational assistant, which is expected to answer most of the questions from a user to user's satisfaction so that manual intervention is least needed, unless required for very specific reasons. Abstract anaphoric reference resolution requires establishing a relationship between an antecedent and its anaphor.

Conventional systems resolve only co-reference resolution by using mention-ranking models that resolve a noun phrase to an entity or an object. Most of the existing methods apply standard NLP algorithms to identify entities and then associate these to subsequent pronoun occurrence, which works for pronoun resolution. Some existing systems involve usage of knowledge graphs to answer various questions from users. These systems are mostly limited to factoid retrieval from knowledge graphs. There exists a system that uses automatic paragraph comprehension to answer users' questions using a memory network. Such systems requires manual review of answers to be shown to users and are not capable of handling complex queries.

SUMMARY

Embodiments of the present disclosure present technological improvements as solutions to one or more of the above-mentioned technical problems recognized by the inventors in conventional systems. For example, in one aspect, there is provided a processor implemented method, comprising: receiving, in a multi-turn retrieval chat-bot, a plurality of consecutive utterances comprising of at least a sub-set of utterances indicative of anaphoric reference to specific entities or facts comprised in past utterances, in a multi-turn retrieval chat-bot; generating, (i) one or more sequences of the plurality of consecutive utterances and (ii) obtaining one or more pre-created corresponding responses from the database for each of the one or more generated sequences; training, a Deep Hierarchical Maxpool Network (DHMN) based model, using the one or more generated sequences, and the plurality of consecutive utterances, to (a) obtain a representation for each of (i) the one or more generated sequences, and (ii) the plurality of consecutive utterances, (b) identify contextual dependencies within the one or more generated sequences using each representation to resolve anaphoric references; updating, using a Character to Word Encoder (CWE) network comprised in the DHMN based model, the representation of the plurality of consecutive utterances based on a presence or an absence of discrepancies in one or more utterances comprised in an incoming sequence of utterances; and classifying, using the trained DHMN based model and the identified contextual dependencies, the incoming sequence of utterances, based on at least one of (i) the updated representation, and (ii) the representation of the one or more generated sequences, into at least one of the one or more pre-created corresponding answers.

In an embodiment, the updated representation is based on a similarity score between a predicted word embedding and an actual word embedding of the words comprised in the each of the plurality of utterances, wherein the similarity score is computed using a loss function. In an embodiment, the step of updating the representation by Character to Word Encoder (CWE) network comprises refraining misclassification of utterances. In an embodiment, the method further comprising upon receiving the plurality of consecutive utterances, determining one or more actions to be performed for the plurality of consecutive utterances. In an embodiment, the method further comprising dynamically optimizing the DHMN based model based on at least one of the updated representation and the incoming sequence of utterances being classified into at least one of the one or more pre-created corresponding answers.

In another aspect, there is provided a system comprising: a memory storing instructions; one or more communication interfaces; and one or more hardware processors coupled to the memory through the one or more communication interfaces, wherein the one or more hardware processors are configured by the instructions to receive, in a multi-turn retrieval chat-bot, a plurality of consecutive utterances comprising of at least a sub-set of utterances indicative of anaphoric reference to specific entities or facts comprised in past utterances, in a multi-turn retrieval chat-bot; generate, (i) one or more sequences of the plurality of consecutive utterances and (ii) obtaining one or more pre-created corresponding responses from the database for each of the one or more generated sequences; train, a Deep Hierarchical Maxpool Network (DHMN) based model, using the one or more generated sequences, and the plurality of consecutive utterances, to (a) obtain a representation for each of (i) the one or more generated sequences, and (ii) the plurality of consecutive utterances, (b) identify contextual dependencies within the one or more generated sequences using each representation to resolve anaphoric references; update, using a Character to Word Encoder (CWE) network comprised in the DHMN based model, the representation of the plurality of consecutive utterances based on a presence or an absence of discrepancies in one or more utterances comprised in an incoming sequence of utterances; and classify, using the trained DHMN based model and the identified contextual dependencies, the incoming sequence of utterances, based on at least one of (i) the updated representation, and (ii) the representation of the one or more generated sequences, into at least one of the one or more pre-created corresponding answers.

In an embodiment, the updated representation is based on a similarity score between a predicted word embedding and an actual word embedding of the words comprised in the each of the plurality of utterances, wherein the similarity score is computed using a loss function. In an embodiment, the representation of the plurality of consecutive utterances is updated by the Character to Word Encoder (CWE) network to refrain misclassification of utterances. In an embodiment, the one or more hardware processors are further configured by the instructions to determine one or more actions to be performed for the plurality of consecutive utterances being received. In an embodiment, the one or more hardware processors are further configured to dynamically optimize the DHMN based model based on at least one of the updated representation and the incoming sequence of utterances being classified into at least one of the one or more pre-created corresponding answers.

In yet another aspect, there are provided one or more non-transitory machine readable information storage mediums comprising one or more instructions which when executed by one or more hardware processors cause receiving, in a multi-turn retrieval chat-bot, a plurality of consecutive utterances comprising of at least a sub-set of utterances indicative of anaphoric reference to specific entities or facts comprised in past utterances, in a multi-turn retrieval chat-bot; generating, (i) one or more sequences of the plurality of consecutive utterances and (ii) obtaining one or more pre-created corresponding responses from the database for each of the one or more generated sequences; training, a Deep Hierarchical Maxpool Network (DHMN) based model, using the one or more generated sequences, and the plurality of consecutive utterances, to (a) obtain a representation for each of (i) the one or more generated sequences, and (ii) the plurality of consecutive utterances, (b) identify contextual dependencies within the one or more generated sequences using each representation to resolve anaphoric references; updating, using a Character to Word Encoder (CWE) network comprised in the DHMN based model, the representation of the plurality of consecutive utterances based on a presence or an absence of discrepancies in one or more utterances comprised in an incoming sequence of utterances; and classifying, using the trained DHMN based model and the identified contextual dependencies, the incoming sequence of utterances, based on at least one of (i) the updated representation, and (ii) the representation of the one or more generated sequences, into at least one of the one or more pre-created corresponding answers.

In an embodiment, the updated representation is based on a similarity score between a predicted word embedding and an actual word embedding of the words comprised in the each of the plurality of utterances, wherein the similarity score is computed using a loss function. In an embodiment, the step of updating the representation by Character to Word Encoder (CWE) network comprises refraining misclassification of utterances. In an embodiment, upon receiving the plurality of consecutive utterances, the instructions may further cause, determining one or more actions to be performed for the plurality of consecutive utterances. In an embodiment, the instructions may further cause dynamically optimizing the DHMN based model based on at least one of the updated representation and the incoming sequence of utterances being classified into at least one of the one or more pre-created corresponding answers.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a system and method for resolving abstract anaphoric references in conservational systems using hierarchically stacked neural networks, alternatively referred throughout the description as hierarchical neural network. In a conversational system, when a reference of an utterance is made to a fact or an event, it is referred to as abstract anaphoric resolution. The problem of abstract anaphoric references in the conversational systems is based on learnings and usage pattern of a conversational assistant deployed for thousands of users, in an organization. The system as implemented by the embodiments of the present disclosure uses a Hierarchical Neural Network (HNN) based model comprising a multilayer layer network with each network comprising of a Bidirectional long short-term memory (BiLSTM) layer, a maxpool layer that are hierarchically stacked to 1) obtain a representation of each utterance received from users and 2) obtain a representation for sequence of utterances. In an embodiment, the multilayer network comprises a Deep Hierarchical Maxpool network (DHMN) based model comprising two networks and a Character to Word Encoder (CWE) network, supporting the DHMN as a spell checker. The DHMN based model, which is a hierarchical neural network model captures both word level as well as sentence level patterns, and also captures contextual dependencies within a sequence of utterances, in its representation of users' session of conversation. Therefore it becomes possible to resolve the abstract anaphoric references including posterior references in conservational systems beyond a pair of utterances. These representations are further used to receive corresponding responses for the utterances. The performance of DHMN based model is further improvised by using skip connections, in third network of the DHMN based model (top network in the hierarchy of DHMN based model), to allow better gradient flow. The DHMN based model, not only resolves the antecedent and posterior facts, but also performs better even on self-contained queries. The DHMN based model is also faster to train, making the proposed method a promising approach for use in environment where frequent training and tuning is needed. The DHMN based model slightly outperforms the benchmark on publicly available datasets, and performs better than baselines approaches on some pre-created datasets.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

Figure 1:
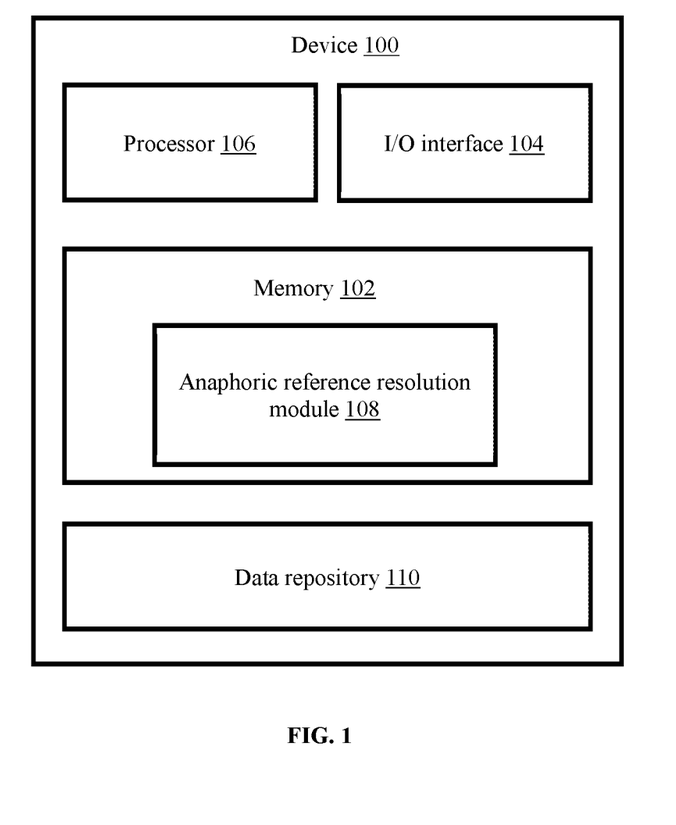
FIG. 1 illustrates a system for resolving abstract anaphoric references in conversational systems using hierarchically stacked neural networks, in accordance with some embodiments of the present disclosure.

FIG. 1 illustrates a system diagram for resolving abstract anaphoric references in conversational systems using hierarchically stacked neural networks, in accordance with an example embodiment of the present subject. The system 100 includes or is otherwise in communication with one or more hardware processors such as a processor 106, an I/O interface 104, at least one memory such as a memory 102, and an anaphoric reference resolution module 108 comprised in the memory 102. In an embodiment, the anaphoric reference resolution module 108 can be implemented as a standalone unit in the system 100. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes the anaphoric reference resolution module 108 and a repository 110 for storing data processed, received, and generated by the anaphoric reference resolution module 108. The anaphoric reference resolution module 108 may include routines, programs, objects, components, data structures, and so on, which perform particular tasks or implement particular abstract data types.

The repository 110, amongst other things, includes a system database and other data. The other data may include data generated as a result of the execution of the anaphoric reference resolution module 108.

In an embodiment, the anaphoric reference resolution module 108 can be configured to reduce the manual intervention. A detailed description of the above-described system for resolving abstract anaphoric references in conversational systems using hierarchically stacked neural networks is shown with respect to illustrations represented with reference to FIGS. 1 through 6.

Figure 2:
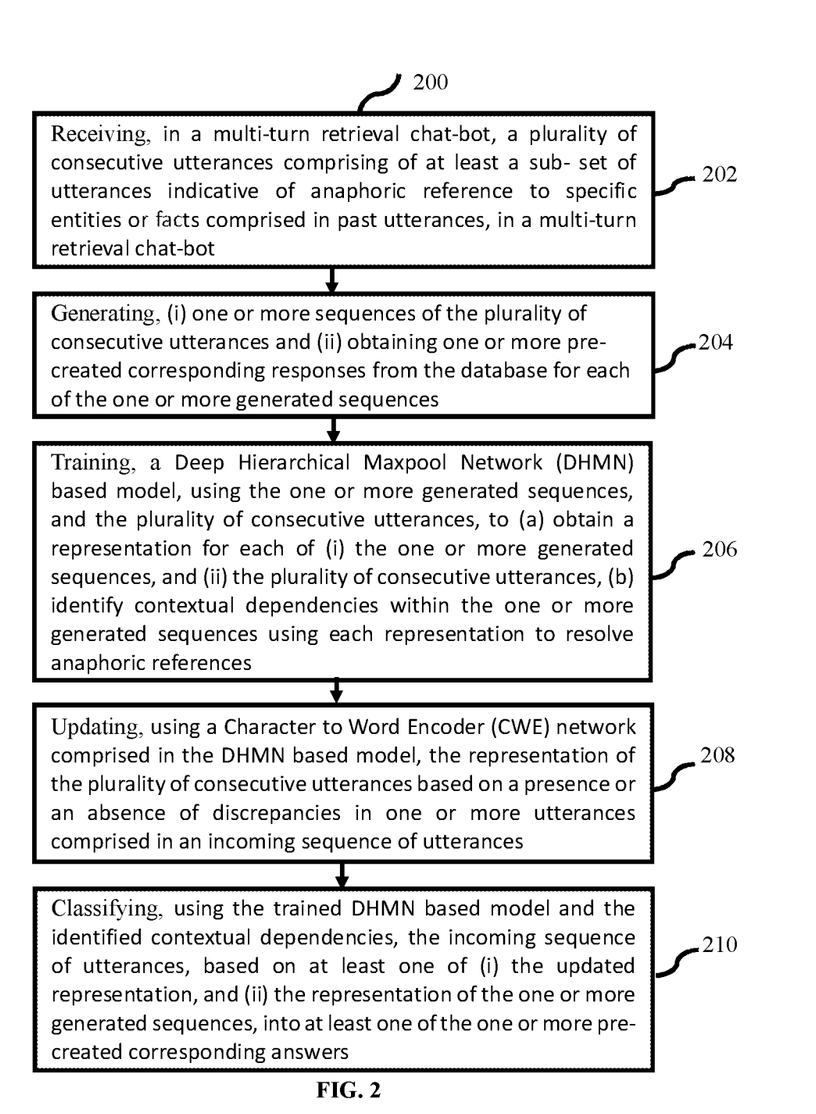
FIG. 2 illustrates a flow diagram for resolving abstract anaphoric references in conversational systems using hierarchically stacked neural networks, in accordance with some embodiments of the present disclosure.

FIG. 2, with reference to FIG. 1, is an exemplary flow diagram of a processor implemented method for resolving abstract anaphoric references in conversational systems using hierarchically stacked neural networks, using anaphoric reference resolution module 108 of FIG. 1, in accordance with some embodiments of the present disclosure. Referring to FIG. 2, at step 202, the one or more hardware processors 106 are configured to receive a plurality of consecutive utterances comprising of at least a sub-set of utterances indicative of anaphoric reference to specific entities or facts comprised in past utterances in a multi-turn retrieval chat-bot. In an embodiment, an utterance could be but not limited to an assertion of a fact by the user, a query, a combination of fact and query and the like. For example, an utterance 'I am a new joinee' is a fact but utterance 'Am I eligible for leave?' is a query. Further, at least a sub-set of utterances from the received plurality of consecutive utterances are the utterances that makes anaphoric reference to specific entities or facts mentioned in any of the past utterances. The anaphoric reference of an utterance to specific entities or facts mentioned in past utterances is further explained with the help of examples mentioned in Table 1 and Table 2.

TABLE 1

| Session and Utterance IDs | User Utterance | Utterance/reference Type | Expected system response |
|---|---|---|---|
| $x_1u_1^1$ | What is a flexi leave? | Entity - flexi leave | Ans: Flexi Holidays are paid . . . |
| $x_1u_1^1$ | What is the eligibility criterion for it? | Pronoun Reference | Ans: Flexi Holiday is applicable to all full time . . . |

TABLE 2

| Session and Utterance IDs | User Utterance | Utterance/ reference Type | Expected system response |
|---|---|---|---|
| $x_2u_1^2$ | I am new joinee | Ant. Fact - 1 | Fact Response: OK |
| $x_2u_2^2$ | I am not well and my doctor advised 15 days of rest | Ant. Fact - 2 | Fact Response: Tell me more . . . |
| $x_2u_3^2$ | I don't have sufficient leave balance | Ant. Fact - 3 | Fact Response: Hmm . . . I see |
| $x_2u_4^2$ | What should I do? | Query | Ans: Employees with less than 2 years of service may be granted . . . |

For example, in a first type of scenario (also referred as session represented by $x_1$) as depicted in Table 1, it is assumed that the system 100 receives two consecutive utterances denoted by $u_1^1$ and $u_2^1$. Here the first utterance is 'What is a flexi leave?' and the second utterance is 'What is the eligibility criterion for it?'. It can be seen from Table 1 that an entity is mentioned in first utterance, for example 'flexi leave' is mentioned as an entity in $u_1^1$ of Table 1, which is referred to via a pronoun in second utterance, for example 'it' in $u_2^1$. Thus, it is evident that the second utterance is indicative of anaphoric reference to entity 'flexi leave' comprised in past utterances (in this case $u_1^1$). Further, in a second type of scenario as depicted in Table 2, it is assumed that the system 100 is expected to consider multiple different past utterances before answering a query. Here, user first asserts three facts one after the other as $u_1^2$, $u_2^2$, $u_3^2$, which lead to a complex situation, and then (user) asks a question 'What should I do?' which has no meaning without its antecedent utterances. Thus, the utterance $u_4^2$ depicting a query 'What should I do?' is indicative of anaphoric reference to facts mentioned in past utterances. Here, it is very important to note that answer to the same query would be different if the first fact $u_1^2$, 'I am new joinee' would not be present in the session of conversation. In an embodiment, all the received utterances and their corresponding pre-created responses are stored in a system database which gets continuously updated. In an embodiment, upon receiving the plurality of consecutive utterances, one or more actions are determined to be performed for the plurality of consecutive utterances. In an embodiment, the one or more actions include simply providing an acknowledgement regarding the system 100 understandability of an utterance received from user or providing a specific reaction to an utterance in the form of answer. For example, if the received utterance represents a fact such as 'I am new joinee', then the system 100 provides an acknowledgment with 'OK'. Here, the acknowledgement depicts that the system 100 has (or may have) understood the meaning of the utterance. Further, if the received utterance represents a query such as 'Can I avail leave', then the system 100 realizes that an answer is required to be provided to the query by selecting an answer from one or more pre-created responses stored in the system's database (or memory 102). Here, the answer is determined based on the past utterance which is a fact since the query is based on the fact.

Further, as depicted in step 204 of FIG. 2, the one or more hardware processors 106 are configured to generate one or more sequences of the plurality of consecutive utterances. Further, one or more pre-created corresponding responses are obtained for each of the one or more generated sequences from the database (also referred as data repository 110 and interchangeably used herein). In an embodiment, one or more sequences are generated by grouping a number of last consecutive utterances from start of current session of conversation. In an embodiment, the maximum number of last consecutive utterances in a group is say 5. Thus, the system 100 can handle, for example, a sequence length of up to 5 utterances, in such scenarios. For example, when a user first passes $u_1^3$ as input. Then generated sequence denoted by $x_1^3$ at time $t_1$ would be $\{u_1^3\}$. Next, if the user passes $u_2^3$ as input, then generated sequence denoted by $x_3^2$ at time $t_2$ would be $\{u_1^3, u_2^3\}$, and likewise at time $x_3^3 = \{u_1^3, u_2^3, u_3^3\}$. Further, if there is a gap of time between two consecutive utterances which is denoted by $t_{min}$, then the second utterance is assumed as start of a session of conversation.

Further, as depicted in step 206 of FIG. 2, a Deep Hierarchical Maxpool Network (DHMN) based model is trained by the one or more hardware processors 106, using the one or more generated sequences, and the plurality of consecutive utterances. Training data $D_{trn}$ consists of training tuples $d_i$, comprising the one or more generated sequences as input ($x_i$) and their corresponding responses yj such that $d_i = \{x_i, y_j\}$. The training data contains semantically similar sequences of consecutive utterances with the same response which mean that different $x_i$ may map to the same response $y_j$. Some of the training tuples may contain only one utterance in its $x_i$, and corresponding, $y_j$. The training data may contain at-least $n_{min}$ such training tuples for every response. Other types of training tuples contain more than one utterance, and number of all such possible generated sequences can be very large, and therefore training data $D_{trn}$ can contain only a representative set of such sequences. This problem is modeled as a multi class classification problem, in which for any generated sequence $x_i$, a response is retrieved.

Figure 3:
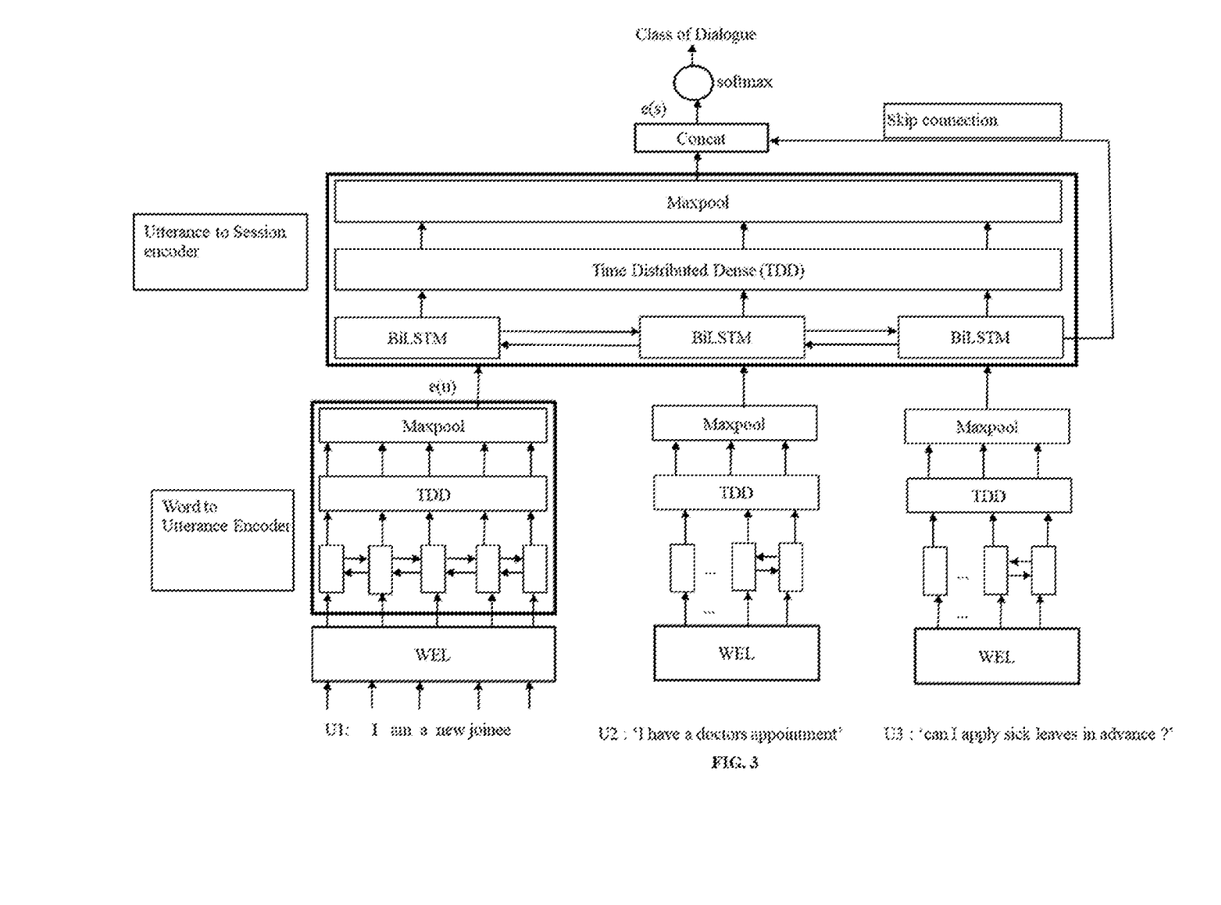
FIG. 3 illustrates architecture of a deep hierarchical maxpool network based model for resolving abstract anaphoric references conversational systems using hierarchically stacked neural networks, in accordance with some embodiments of the present disclosure
Figure 4:
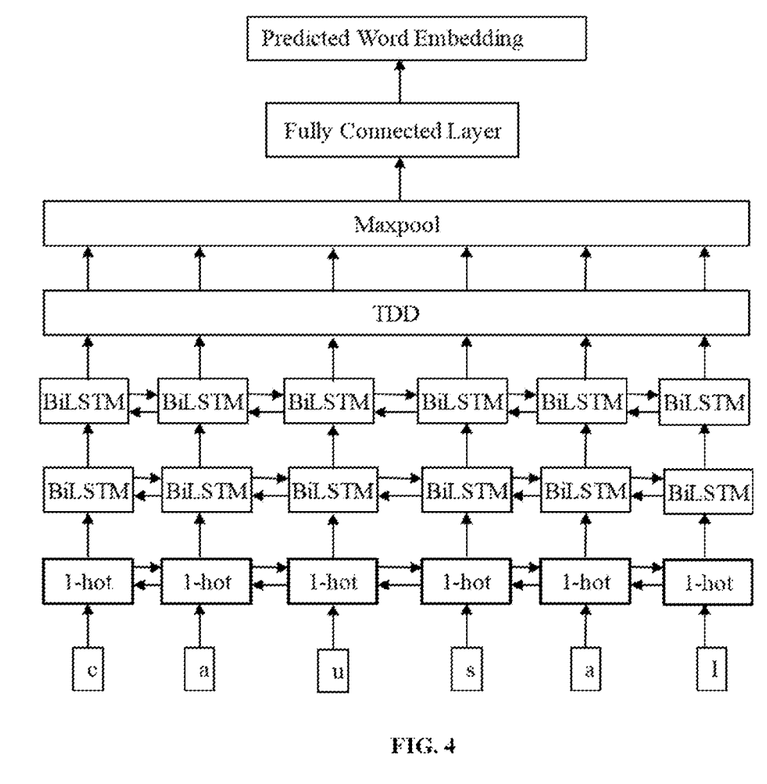
FIG. 4 illustrates architecture of a Character to Word Encoder (CWE) network, in accordance with some embodiments of the present disclosure.

Referring to FIG. 3, FIG. 3 illustrates the architecture of the deep hierarchical maxpool network (DHMN) based model. The deep neural network (herein, the DHMN) comprises of three networks, which are hierarchically connected to produce a representation/embedding of the one or more generated sequences e(x). The first network is a Character to Word Encoder Network (CWE), depicted in detail in FIG. 4, is used for learning a representation of words (w) comprised in each utterance. The character to word encoder takes sequence of characters comprised in the words represented by $w = \{c_1 \ldots c_n\}$ as input. The character to word encoder network acts as a spell checker. The word representations taken from the CWE network is then passed to a second network which learns to represent each utterance from the plurality of consecutive utterances received from user, wherein each utterance is denoted by $u_i$. The second network is referred to as Word to Utterance Encoder Network. Here, utterance is a sequence of words, $u_i = \{w_1 \ldots w_n\}$. The second network comprises an embedding layer, a BiLSTM layer, a Time Distributed Dense (TDD) layer and a maxpool layer. In an embodiment, each utterance $u_i$ is a sequence of words of varying lengths, $u_i = \{w_1 \ldots w_n\}$ and the maximum length of each utterance is $n_{max}$. Each utterance is represented as a sequence of one-hot encoding of its words, of length $n_{max}$ with zero padding. The embedding layer of the second network receives the sequence of one-hot encoding of words comprised in each utterance as input. The embedding layer is also referred as Word Embedding Layer (WEL) as depicted in FIG. 3. The output of the embedding layer is a sequence of embeddings of the words comprised in each utterance (alternatively referred as word embeddings) which is represented in equation (1):

$$u_i = \{(w_1), e(w_2) \ldots e(w_{n_{max}})\} \quad (1)$$

The word embeddings, using a word-to-vector model, are learnt on all the utterances, answers, and the related policy documents together. These word embeddings become the initial weight of the Embedding layer (WEL), which is the first layer in Word to Utterance Encoder Network. Weights of the embedding layer also get updated via back-propagation during training of rest of the model.

The next layer in the second network is the BiLSTM layer which comprises of Bidirectional LSTM Units, as shown in FIG. 3. As a background the LSTMs or Long Short Term Memory networks are a variant of neural networks. LSTMs are designed to mitigate the issue of vanishing gradient, which occurs when neural networks learn sequences with long term patterns. Each utterance returned by Embedding layer, is represented as a sequence of vectors at each time-stamp which is represented $u_i = \{(w_1), e(w_2) \ldots e(w_{n_{max}})\}$, which is input to the BiLSTM layer. This sequence of vectors is given as input in both forward and reverse order which retains the context of other words both on left and right hand side of every word comprised in each utterance. The output of LSTM unit is controlled by a set of gates in $R_d$ as a function of the previous hidden state $h_{t-1}$ and the input at the current time step $v_t$ as defined below:

input gate, $i_t = \sigma(\theta_{vi})v_t + \theta h_i h_{t-1} + b_i$ forget gate, $f_t = \sigma(\theta_{vf})v_t + \theta h_f h_{t-1} + b_f$ output gate, $o_t = \sigma(\theta_{vo})v_t + \theta h_o h_{t-1} + b_o$ candidate hidden st., $g_t = \tanh(\theta_{vo})v_t + \theta h_o h_{t-1} + b_o$ internal memory, $c_t = f_t \oplus c_{t-1} + i_t \oplus g_t$ hidden state, $h_t = o_t \oplus \tanh(c_t)$ (2)

Here, σ is the logistic sigmoid function, tanh denotes the hyperbolic tangent function, and ⊕ denotes the element wise multiplication. $f_t$ denotes a function used to decide the amount of information going to be forgotten from the old memory cell, $i_t$ denotes a function to control the amount of new information going to be stored in the current memory cell, and $o_t$ denotes a function that controls output based on memory cell, wherein the memory cell is represented as $c_t$. Output of the BiLSTM layer is T hidden states, one at every time step, which is then passed through the Time Distributed Dense (TDD) layer of the second network. This is same as applying a fully connected dense layer on the output of BiLSTM at each time step separately and get output at every time step. The weights of the TDD layer is same across all time steps. Output of the TDD layer is then passed through the maxpool layer of the second network. The maxpool layer of the second network acts as a form of attention layer of the network and picks up the most important semantic features of utterances which are in the form of user queries. This layer takes dimension-wise maximum value to form a final vector. The final vector is the embedding of each utterance $(u_i)$.

Finally, the third network, referred to as Utterance to Session encoder Network, takes the representation of each utterance and learns to represent one or more generated sequence of utterances. Here the one or more generated sequence of utterances are denoted by (x). The third network comprises a BiLSTM layer, a Time Distributed Dense (TDD) layer and a maxpool layer. The third network receives the output of second network which is embeddings of each utterance as input. At each time step, such an embedding is fed into the BiLSTM layer of the third network, which generates T hidden states. The hidden states are passed to the TDD Layer and further to the maxpool layer of the third network to get a max-pooled representation of the hidden states. In addition to this, a skip connection is used from BiLSTM layer to the softmax layer, for better flow of gradient. Thus, by using the skip connection, the last hidden state is passed from BiLSTM layer h, and concatenated with the output of maxpool layer to get a final session embedding(s). This embedding captures appropriate signal from both the last utterance and the most significant utterances of the session.

In an embodiment, the trained Deep Hierarchical Maxpool Network (DHMN) based model is used to obtain a representation for each of (i) the one or more generated sequences, and (ii) the plurality of consecutive utterances. The obtained representations for each of (i) the one or more generated sequences, and (ii) the plurality of consecutive utterances are further utilized to identify contextual dependencies within the one or more generated sequences using each representation. In an embodiment, based on the identified contextual dependencies, one or more relevant past utterances corresponding to one or more utterances of the consecutive utterances are obtained. The one or more relevant past utterances are obtained by querying the system database based on the anaphoric reference of an utterance to specific entities or facts comprised in the past utterances. In such cases, anaphoric reference is determined based on the identified contextual dependencies. Thus, the irrelevant utterances are ignored by the system while selecting an answer for a specific utterance. In an embodiment, identification of contextual dependencies within the one or more generated sequences using representations obtained from the DHMN based model is further explained by the way of a non-limiting example. Referring to Table 3, it can be seen that the system 100 tries to resolve a posterior fact to an antecedent query, as shown in session $x_3$ of Table 3. Here, the user asks a query $u_2^3$ 'Can I apply for adoption leave' after asserting the fact $u_1^3$ 'I have recently adopted a baby', but modifies the situation in next utterance $u_3^3$ with another fact 'Currently I am on leave without pay for dependent care'. This leads the system to modify the answer which was given at the end of $u_2^3$. The proposed system generates a sequence of utterances provided in the Table 3 as $\{u_1^3, u_1^3, u_1^3\}$ and identifies contextual dependencies within the generated sequence by using representations for each of (i) the one or more generated sequences, (ii) the plurality of consecutive utterances, obtained from the DHMN based model. The identified contextual dependencies within the one or more generated sequences helps in determining anaphoric references of an utterance to other utterances. Abstract anaphoric reference resolution requires establishing a relationship between an antecedent and its anaphor. Thus, based on the identified contextual dependencies, the problem of anaphoric references in conversational systems are resolved.

TABLE 3

| Session and Utterance IDs | User Utterance | Utterance/reference Type | Expected system response |
|---|---|---|---|
| $x_3u_1^3$ | I have recently adopted a baby | Ant. Fact - 1 | Fact Response: Hmm . . . I see |

TABLE 3-continued

| Session and Utterance IDs | User Utterance | Utterance/reference Type | Expected system response |
|---|---|---|---|
| $x_3u_2^3$ | Can I apply for adoption leave? | Query | Ans: All full time employees can apply for leave |
| $x_3u_3^3$ | Currently I am on leave without pay for dependent care | Post. Fact - 2 | Ans: While on Leave Without Pay you cannot apply for leave |

Referring back to FIG. 2, at step 208, the one or more hardware processors 106 are configured to update the representation of the plurality of consecutive utterances based on a presence or an absence of discrepancies in one or more utterances comprised in an incoming sequence of utterances. The step of updating the representation of the plurality of consecutive utterances is performed by the Character to Word Encoder (CWE) network comprised in the DHMN based model. In an embodiment, incoming sequence of utterances refers to test input received after the DHMN based model is trained. Based on an analysis, some instances are observed in which several words in an utterance are either not present or misspelled. The misspelled words are identified as discrepancies. When there is no discrepancy in any of the utterances comprised in the incoming sequence of utterances, then the incoming sequence of utterances is simply fed to second and third network of the DHMN based model to obtain its representation. However, when a discrepancy is identified in any of the utterances comprised in the incoming sequence of utterances, then a corrective action is performed by the Character to Word Encoder (CWE) network to eliminate the discrepancy. For example, some of the often misspelled words, are {"casal", "causal", "casaul", "casuaal" } for "casual", and {"montsh", "mnths", "monthhs" } for "months". When the utterances comprising misspelled words are fed to second and third network of the DHMN based model, then a wrong (or incorrect) representation of the incoming sequence of utterances is obtained. In order to obtain the right representation for such misspelled words comprised in the incoming sequence of utterances, the Character to Word Encoder Network as shown in FIG. 4 is trained. FIG. 4 illustrates architecture of the Character to Word Encoder (CWE) network comprised in the DHMN based model of the system 100 of FIG. 1, in accordance with some embodiments of the present disclosure. The CWE network comprises two layers of BiLSTM followed by a time distributed dense (TDD) layer and maxpool layer. The CWE network receives a sequence of one-hot encoding of the English alphabets which occur in a word. Using the CWE network, first word embedding of correctly spelled words are predicted, as learned by using a word2vec model. The word2vec model is learnt using skip gram algorithm. In an embodiment, the updated representation is based on a similarity score between a predicted word embedding and an actual word embedding of the words comprised in the each of the plurality of utterances, wherein the similarity score is computed using a loss function. In other words, the CWE is trained by learning a loss function as provided in equation (3) which computes a cosine similarity between a predicted word embedding and an actual word embedding (also referred as out of vocabulary word embedding denoted by $w_{oov}$) of the words comprised in each of the plurality of consecutive utterances.

$$\text{Loss function} = \max(\cos(w_p, w_{oov})) = \max\left(\frac{w_p \cdot w_{oov}}{\|w_p\|\|w_{oov}\|}\right) \quad (3)$$

Here, $w_p$ denotes the predicted words and $w_{oov}$ denotes the actual words (also referred as out of vocabulary word) comprised in each of the plurality of consecutive utterances.

The CWE network is used only for out of vocabulary words ($w_{oov}$) at the inference time to first predict the right word $w_p$ from vocabulary as a replacement of the out of vocabulary words ($w_{oov}$). If the word is a misspelled word, the predicted word $w_p$ is likely to be its correct replacement with the right spelling. If however, it is an unknown word, the predicted word will not be related to it. To avoid such mistakes, after obtaining the predicted word $w_p$, similarity between the predicted word and the out of vocabulary words is determined using a sequence matcher. The sequence matcher considers each word as a sequence of characters as shown in equation (4) to calculate a match score between the predicted word $w_p$ and the out of vocabulary words ($w_{oov}$).

$$\text{sim}(w_{oov}) = 2*(M/T) \quad (4)$$

Here, M is the number of matches and T is the total number of characters in the out of vocabulary word $w_{oov}$ and predicted word $w_p$. Further, if the calculated score is above a pre-defined threshold, then the predicted word is selected as a word to replace the out of vocabulary words ($w_{oov}$) word, else it is dropped. In an embodiment, the value of the predefined threshold is selected be 0.9. For example, if a word is a misspelled word (e.g., causal), then its correct replacement is predicted using the sequence matcher (e.g., casual). However, if the word is an unknown word (e.g., tiger), then predicted word (i.e., casual) will not be related to it. So, the predicted word is dropped. Thus, the updated representation is based on a similarity score between a predicted word embedding and an actual word embedding of the words comprised in each of the plurality of consecutive utterances.

Further, at step 210 of FIG. 2, the one or more hardware processors are configured to classify the incoming sequence of utterances into at least one of the one or more pre-created corresponding answers. For example, if the DHMN based model is trained for 'leave' related utterances, then one or more answers are pre-created based on the type of leave related utterances. Further, the incoming sequence of utterances which denotes test input are classified into one of the one or more pre-created corresponding answers using the trained DHMN based model and the identified contextual dependencies, based on at least one of (i) the updated representation, and (ii) the representation of the one or more generated sequences. For example, as depicted in Table 3, response to query 'Can I apply for adoption leave?' is 'All full time employees can apply for leave' and response to posterior fact 'Currently I am on leave without pay for dependent care' is 'While on Leave Without Pay you cannot apply for leave'. It can be seen that response is modified for the posterior fact $u_3^3$ which is determined based on the contextual dependency between the posterior fact and past utterances (in this case $u_1^3$ and $u_2^3$).

In an embodiment, the step of updating the representation by character to Character to Word Encoder (CWE) network comprises refraining misclassification of utterances. For example, if misspelled words are fed to the DHMN based model, then a wrong (an incorrect) representation of the incoming sequence of utterances is obtained. The wrong (incorrect) representations results in classification of the incoming sequence of utterances into wrong (incorrect) class. However, the CWE network provides correct replacement of the misspelled words and thus a right representation of the incoming sequence of utterances is obtained by DHMN based model. Thus, misclassification of the incoming sequence of utterances is refrained by updating the representation of the incoming sequence of utterances by Character to Word Encoder (CWE) network. The updated representations are dynamically learnt by the DHMN based model and utilized for further training. Thus, the performance of DHMN based model is dynamically optimized based on at least one of the updated representation and the incoming sequence of utterances being classified into at least one of the one or more pre-created corresponding answers.

The method and system as described by the present disclosure resolves abstract anaphoric references across many different utterances as compared to existing systems which are limited to only two user utterances. Also, the proposed method attempts to resolve posterior references. The training data used by the system contains many semantically similar sequences of user utterances which lead to the same answer, and system is required to choose from these predefined answers. As opposed to prior approaches that rank the answers based on similarity between the question and the answers, the proposed system manages the data in such a form that there are several sequences of utterances belonging to one class. Hence, the proposed system is more suitable for a classification kind of task.

Experimental Setup

Experiments by the system were conducted on known datasets. Also, the known datasets were considered as the seed model in actual production environment. The datasets represent actual users' behavior, which is observed to contain pronoun references to entities mentioned in past utterances as well as to the facts pertinent to individual's situation. The datasets also comprised completely self-contained queries. Initially, a first dataset was considered which comprised 7164 different type of utterances related to leave domain. Some of these utterances were completely self-contained, and could not be split in two parts as antecedent and query. For example, 'How many leave types are there?'. Further, a second dataset (B) was created comprising completely self-contained queries which are hereafter referred to as no fact queries. Furthermore, a third dataset is created with utterances that contains an antecedent clause along with a query. For example, 'I am a Business Associate, can I avail a casual leave?' has two clauses separated by a comma. Number of antecedent clause in such utterances can sometimes be more than one. Similarly, sometimes a query comes before a fact. All such utterances, which contain fact utterances before or after a query are hereafter referred to as with fact queries are comprised in dataset (C). Also, it is observed that usually the number of such clauses is maximum five in the same query.

Figure 5:
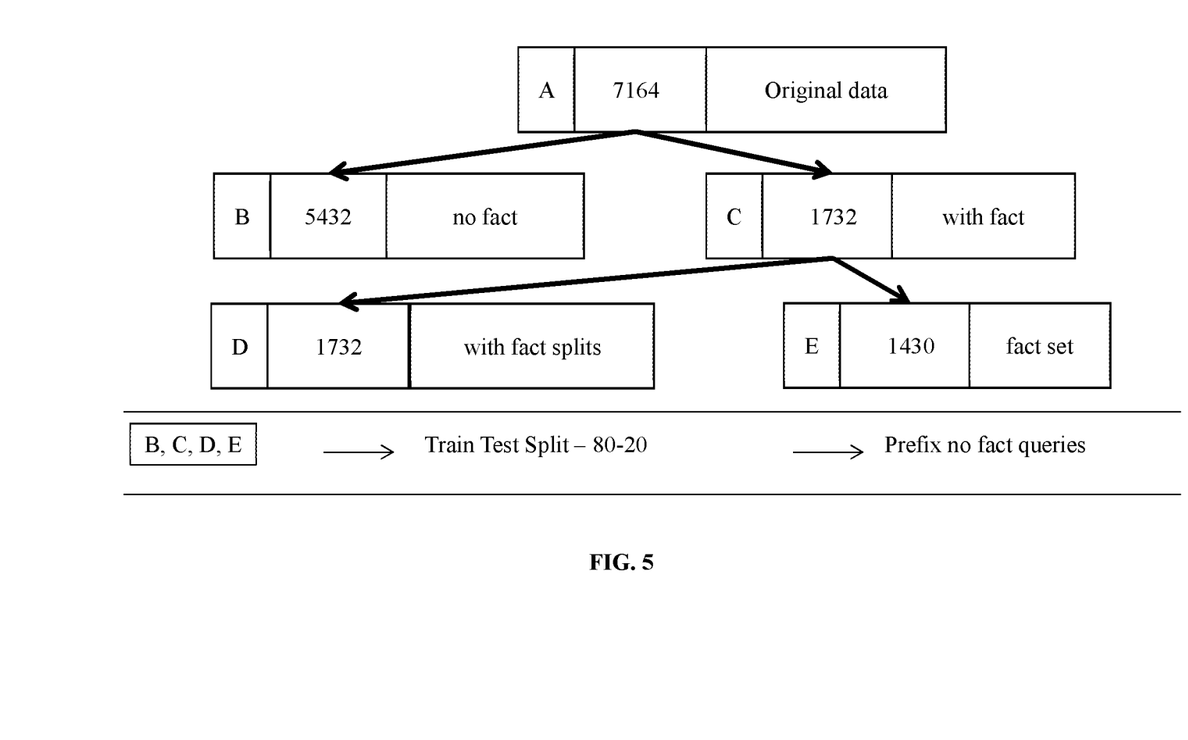
FIG. 5 illustrates details of data preparation process, in accordance with some embodiments of the present disclosure.
Figure 6:
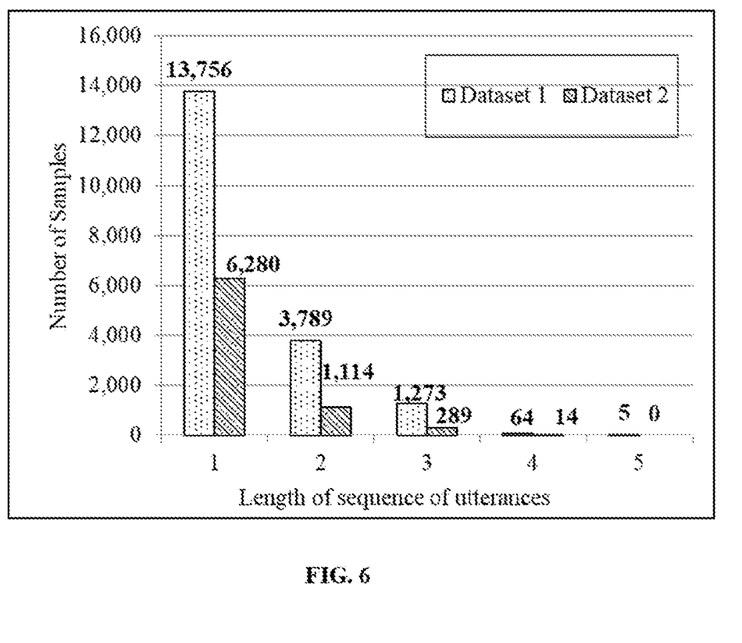
FIG. 6 is a graph illustrating distribution of sequence lengths, in accordance with some embodiments of the present disclosure.

In an embodiment, the proposed system involves generation of one or more sequences of utterances received from users. For generation of the one or more sequences, first every 'with fact query' split into multiple different utterances (e.g., with help of human intervention), forming a sequence of utterances, referred to as with fact splits. A fourth dataset (D) was created comprising all the with fact splits. The distribution of length of such generated sequences is given in FIG. 6. The graph shows total number of samples in Dataset 1 and Dataset 2 based on the value of the length of sequence of utterances. It can be seen in FIG. 6 that highest number of samples are comprised in generated sequences with length 1 and lowest number of samples are comprised in generated sequences with length 5. Further, from such splits another set of utterances was created, which contain only the facts and no queries. This set of utterances is hereafter referred to as fact set which are comprised in a fifth created dataset (E). Further, a final dataset comprising of generated sequences $x_i$, and their responses $y_i$ was created by taking all the B, and E datasets into consideration as shown in FIG. 5. The responses for all the queries in B, and D datasets come from the original dataset, and for all the generated sequences of E dataset, a fixed response is assumed. The queries of B, and E datasets were divided in two parts randomly in 80-20 ratio for Train and Test splits, then a final dataset for each of Train and Test splits was prepared separately. Further, sequences of utterances of length 5 were generated, by prefixing no fact queries (taken from B dataset) to every query of the datasets B, and E, to obtain B', C', D' and E' datasets. The data (union of B, B', ', D' and E') thus obtained was then reviewed to ensure that the response for any of the generated sequences appears right to a human being. This process provides the data as shown in Table 4.

TABLE 4

| Property | Dataset 1 | Dataset 2 | Dataset 3 |
| --- | --- | --- | --- |
| Train data | 11031 | 5460 | 268,013 |
| Val data | 3677 | 1818 | 33,501 |
| Test data | 3677 | 1818 | 33,501 |
| No of classes | 311 | 229 | 5 |

In an embodiment, some pre-processing steps such as lower case conversion, removal of special characters and abbreviation replacement were performed before the data for learning word representations is passed. All the policy documents, chatbot answers as well as questions of all the query sets are used for learning domain specific vector representations of all words. The proposed system also utilizes General purpose GLOVE word embeddings learned on the English Wikipedia® data, however it is observed that domain specific word embeddings render better accuracy, which could happen due to orthogonal meanings of the words such as "Leave".

The proposed algorithm DHMN is compared on three known datasets (e.g., Dataset 1, Dataset 2 and Dataset 3) with four baseline algorithms. Three splits of the known datasets with 60% for training, 20% each for validation and testing data, are considered. A known dataset has been provided with fixed train, validation and test split. Further, hyper-parameter tuning is performed for hierarchical max-pool network for the hidden number of nodes {100, 150, . . . , 350} with a step-size of 50 units, batch-size in range {16, 32, 64, 128}, and the learning rate in range {0.1, 0.01, 0.001, 0.0001}. Furthermore, best set of parameters as chosen on the validation set is obtained. Best results are obtained for number of hidden nodes as 300. Batch size is 32 on Dataset 1 and 64 for Dataset 2. Best results on all the known datasets were obtained by using an Adam optimizer with a default learning rate of 0.001. In an embodiment, it is observed that LSTMs require a lot of training data and have huge number of parameters, as a result they tend to over-fit the training data easily. To prevent overfitting of the training data, some techniques including early stopping, L1/L2 regularization) and dropout were used. A dropout of 0.5 was used, that worked well in this case.

Experimental Results:

Table 5 provides a comparison of average accuracy between baseline models and proposed model, on the three known datasets (e.g., Dataset 1, Dataset 2 and Dataset 3). Numbers marked with * are averaged over 5 runs and numbers not marked are averaged over 10 runs.

TABLE 5

| Model | Dataset 1 | Dataset 2 | Dataset 3 |
|---|---|---|---|
| Hierarchical Character Network (Traditional model) | 82.71 | 78.55 | — |
| Advanced intent model (Traditional model) | 86.84 | 80.62 | — |
| Hierarchical Attention Network (Traditional model) | 88.99 | 81.13 | 68.20 |
| Hierarchical Maxpool Network-GRU (Traditional model) | 90.78 | 83.15 | 66.90 |
| Hierarchical Maxpool Network-LSTM (Traditional model) | 91.27 | 84.88 | 66.89* |
| Model of the present disclosure | 92.47 | 85.23 | 68.42* |

It can be observed from Table 5 that the model of the present disclosure outperforms the traditional advance Intent model (AIM) by a good margin of 6%. The deployed architecture of traditional advance Intent model (AIM) does not use hierarchical structure, thus it has a disadvantage over the architectures which explore the hierarchical structure. Traditional Hierarchical Character Network (HCN) uses a hierarchical structure, thus it is proposed as a benchmark, but it uses a character level representation. However, traditional Hierarchical Character Network (HCN) does not perform well on Dataset 1 because such a model lacks the capability of recognizing semantically similar words, which comes automatically from word2vec. The proposed model gives better performance than model 3 by a margin of around 3% to 4%. Similarly, traditional Hierarchical Maxpool Network-GRU (HMN-GRU) also uses a hierarchical structure, thus traditional HMN-GRU is also used as baseline model. It is observed that the proposed model performs better than traditional HMN-GRU on all three datasets. The proposed model achieves better results than traditional HMN-GRU by a margin of about 2%. Experiments are also run on traditional Hierarchical Maxpool Network-LSTM (HMN-LSTM) which also uses a hierarchical structure and results of the same are reported in the table 5. A two tailed t-test is performed to demonstrate the statistical significance of the results of proposed model, traditional advance Intent model (AIM), and Traditional Hierarchical Attention Network (HAN). The proposed model is able to reject null hypothesis with a good margin on all the three datasets. Hence, the proposed method and system achieves good results on large datasets, and generalizes well.

Table 6 shows the training time for existing models and model of the present disclosure along with the number of trainable parameters. Thus, a comparison of model efficiency of existing methods with the proposed method is provided in Table 6.

TABLE 6

| Model | Parameters | Training time (s) |
|---|---|---|
| Hierarchical Character Network (Traditional model) | 1,659,411 | 4563 |
| Advanced intent model (Traditional model) | 1,914,911 | 3060 |

TABLE 6-continued

| Model | Parameters | Training time (s) |
|---|---|---|
| Hierarchical Attention Network (Traditional model) | 1,158,145 | 3102 |
| Hierarchical Maxpool Network(Traditional model) | 3,537,611 | 2300 |
| Model of the present disclosure | 2,639,711 | 1445 |

It is observed that the proposed model gets trained faster and also converges within a few epochs (below 10). Even though the number of trainable parameters are higher in the proposed model, yet it takes lesser time to train, due to maxpool layer. Faster retrainabilty of a model is important in production environment since the model has to be retrained to incorporate new data. Thus, the proposed method performs better in production environment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
receiving, in a multi-turn retrieval chat-bot, a plurality of consecutive utterances comprising of at least a sub-set of utterances indicative of anaphoric reference to specific entities or facts comprised in past utterances, in a multi-turn retrieval chat-bot;
generating one or more sequences of the plurality of consecutive utterances and obtaining one or more pre-created corresponding responses from the database for each of the one or more generated sequences;
training a Deep Hierarchical Maxpool Network (DHMN) based model, using the one or more generated sequences, and the plurality of consecutive utterances, to (a) obtain a representation for each of (i) the one or more generated sequences, and (ii) the plurality of consecutive utterances, and (b) identify contextual dependencies within the one or more generated sequences using each representation to resolve anaphoric references;
updating, using a Character to Word Encoder (CWE) network comprised in the DHMN based model, the representation of the plurality of consecutive utterances based on a presence or an absence of discrepancies in one or more utterances comprised in an incoming sequence of utterances; and
classifying, using the trained DHMN based model and the identified contextual dependencies, the incoming sequence of utterances, based on at least one of (i) the updated representation, and (ii) the representation of the one or more generated sequences, into at least one of the one or more pre-created corresponding answers.

2. The method of claim 1, further comprising dynamically optimizing the DHMN based model based on at least one of the updated representation and the incoming sequence of utterances being classified into at least one of the one or more pre-created corresponding answers.

3. The method of claim 1, wherein the updated representation is based on a similarity score between a predicted word embedding and an actual word embedding of the words comprised in the each of the plurality of utterances, wherein the similarity score is computed using a loss function.

4. The method of claim 1, wherein updating the representation by Character to Word Encoder (CWE) network comprises refraining misclassification of utterances.

5. The method of claim 1, further comprising upon receiving the plurality of consecutive utterances, determining one or more actions to be performed for the plurality of consecutive utterances.

6. A system, comprising:
a memory;
one or more communication interfaces; and
one or more hardware processors coupled to said memory through said one or more communication interfaces, wherein said one or more hardware processors are configured to:
receive, in a multi-turn retrieval chat-bot, a plurality of consecutive utterances comprising of at least a sub-set of utterances indicative of anaphoric reference to specific entities or facts comprised in past utterances, in a multi-turn retrieval chat-bot;
generate one or more sequences of the plurality of consecutive utterances and obtain one or more pre-created corresponding responses from the database for each of the one or more generated sequences;
train, a Deep Hierarchical Maxpool Network (DHMN) based model, using the one or more generated sequences, the plurality of consecutive utterances, and the one or more relevant past utterances to (a) obtain a representation for each of (i) the one or more generated sequences, and (ii) the plurality of consecutive utterances, and (b) identify contextual dependencies within the one or more generated sequences using each representation to resolve anaphoric references;
update, using a Character to Word Encoder (CWE) network comprised in the DHMN based model, the representation of the plurality of consecutive utterances based on a presence or an absence of discrepancies in one or more utterances comprised in an incoming sequence of utterances; and
classify, using the trained DHMN based model and the identified contextual dependencies, the incoming sequence of utterances, based on at least one of (i) the updated representation, and (ii) the representation of the one or more generated sequences, into at least one of the one or more pre-created corresponding answers.

7. The system of claim 6, the one or more hardware processors are further configured to dynamically optimize the DHMN based model based on at least one of the updated representation and the incoming sequence of utterances being classified into at least one of the one or more pre-created corresponding answers.

8. The system of claim 6, wherein the updated representation is based on a similarity score between a predicted word embedding and an actual word embedding of the words comprised in the each of the plurality of utterances, wherein the similarity score is computed using a loss function.

9. The system of claim 6, wherein the representation of the plurality of consecutive utterances is updated by the Character to Word Encoder (CWE) network to refrain misclassification of utterances.

10. The system of claim 6, wherein the one or more hardware processors are further configured by the instructions to determine one or more actions to be performed for the plurality of consecutive utterances being received.

11. One or more non-transitory machine readable information storage media storing instructions which, when executed by one or more hardware processors, cause the one or more hardware processors to perform operations comprising:

receiving, in a multi-turn retrieval chat-bot, a plurality of consecutive utterances comprising of at least a sub-set of utterances indicative of anaphoric reference to specific entities or facts comprised in past utterances, in a multi-turn retrieval chat-bot;

generating one or more sequences of the plurality of consecutive utterances and obtaining one or more pre-created corresponding responses from the database for each of the one or more generated sequences;

training a Deep Hierarchical Maxpool Network (DHMN) based model, using the one or more generated sequences, and the plurality of consecutive utterances, to (a) obtain a representation for each of (i) the one or more generated sequences, and (ii) the plurality of consecutive utterances, and (b) identify contextual dependencies within the one or more generated sequences using each representation to resolve anaphoric references;

updating, using a Character to Word Encoder (CWE) network comprised in the DHMN based model, the representation of the plurality of consecutive utterances based on a presence or an absence of discrepancies in one or more utterances comprised in an incoming sequence of utterances; and classifying, using the trained DHMN based model and the identified contextual dependencies, the incoming sequence of utterances, based on at least one of (i) the updated representation, and (ii) the representation of the one or more generated sequences, into at least one of the one or more pre-created corresponding answers.

12. The one or more non-transitory machine readable media of claim 11, wherein the operations further comprise dynamically optimizing the DHMN based model based on at least one of the updated representation and the incoming sequence of utterances being classified into at least one of the one or more pre-created corresponding answers.

13. The one or more non-transitory machine readable media of claim 11, wherein the updated representation is based on a similarity score between a predicted word embedding and an actual word embedding of the words comprised in the each of the plurality of utterances, wherein the similarity score is computed using a loss function.

14. The one or more non-transitory machine readable media of claim 11, wherein updating the representation by Character to Word Encoder (CWE) network comprises refraining misclassification of utterances.

15. The one or more non-transitory machine readable media of claim 11, wherein the operations further comprise, upon receiving the plurality of consecutive utterances, determining one or more actions to be performed for the plurality of consecutive utterances.

* * * * *